(12) United States Patent
Tavare

(10) Patent No.: US 10,283,954 B2
(45) Date of Patent: May 7, 2019

(54) CONNECTION SHIELD FOR POWER DISTRIBUTION NETWORKS

(71) Applicant: Nicholas T. Tavare, Pacifica, CA (US)

(72) Inventor: Nicholas T. Tavare, Pacifica, CA (US)

( * ) Notice: Subject to any disclaimer, the term of this patent is extended or adjusted under 35 U.S.C. 154(b) by 0 days.

(21) Appl. No.: 15/955,619

(22) Filed: Apr. 17, 2018

(65) Prior Publication Data
US 2019/0036320 A1    Jan. 31, 2019

Related U.S. Application Data

(60) Provisional application No. 62/538,578, filed on Jul. 28, 2017.

(51) Int. Cl.
*H02G 15/188* (2006.01)
*H01R 13/52* (2006.01)

(52) U.S. Cl.
CPC ....... *H02G 15/188* (2013.01); *H01R 13/5205* (2013.01); *H01R 13/5213* (2013.01); *H01R 13/5216* (2013.01)

(58) Field of Classification Search
CPC ........ H02G 15/113; H02G 15/18; H01R 4/70; H01R 4/46
See application file for complete search history.

(56) References Cited

U.S. PATENT DOCUMENTS

| | | | | |
|---|---|---|---|---|
| 1,939,813 A | * | 12/1933 | Hagist | H01R 4/38 403/283 |
| 1,999,045 A | * | 4/1935 | Goetz | H01R 4/46 174/71 R |
| 2,582,384 A | * | 1/1952 | Knollman | H01R 4/30 24/326 |
| 3,144,506 A | * | 8/1964 | Gunthel, Jr. | H01R 4/38 174/138 F |

(Continued)

FOREIGN PATENT DOCUMENTS

| | | |
|---|---|---|
| CN | 203911067 U | 10/2014 |
| JP | H0911820 A | 1/1997 |

OTHER PUBLICATIONS

3M Scotchlok Self-stripping Insulated T-tap. Downloaded Jun. 6, 2017.

(Continued)

*Primary Examiner* — Ross N Gushi
(74) *Attorney, Agent, or Firm* — Christopher Peil; Law Office of Christopher Peil

(57) ABSTRACT

A shield for spliced electrical connections includes a cover for T-tap electrical connections. In embodiments, the cover includes complementary halves designed to quickly and securely snap together when the halves are mated with each other to create a shield for a T-tap connection. Fully assembled, the shield provides sleeves that allow the cables being spliced to enter and/or exit the shield. Each of the sleeves is provided with an adhesive sealant that tightly seals (Continued)

the shield against contamination from the elements. Integrated with the cover are structural elements such as gussets that enhance the resistance of the shield to impact damage such as crushing. The shield may be molded from a polymer that, when cured, provides a rigid or semi-rigid cover that generally protects the t-tap connection from all types of environmental damage.

19 Claims, 6 Drawing Sheets

(56) References Cited

U.S. PATENT DOCUMENTS

| | | | | | |
|---|---|---|---|---|---|
| 3,325,591 | A * | 6/1967 | Wahl | | H01R 4/5083 174/138 F |
| 3,715,459 | A * | 2/1973 | Hoffman | | H02G 15/113 174/138 F |
| 4,029,896 | A * | 6/1977 | Skinner | | F24C 15/104 174/138 F |
| 4,234,760 | A * | 11/1980 | Lawson | | H01R 4/70 174/138 F |
| 4,435,612 | A * | 3/1984 | Smith | | G02B 6/4447 174/76 |
| 4,451,696 | A * | 5/1984 | Beinhaur | | H01R 4/64 174/76 |
| 4,538,869 | A * | 9/1985 | Richards | | H01R 4/70 439/596 |
| 4,778,405 | A | 10/1988 | Sterken | | |
| 4,935,582 | A | 6/1990 | Calligaris | | |
| 5,017,739 | A * | 5/1991 | Hoffman | | H01R 4/70 174/138 F |
| 5,111,001 | A * | 5/1992 | Jervis | | H02G 15/113 174/76 |
| 5,306,870 | A * | 4/1994 | Abat | | H01R 9/0506 174/659 |
| 5,314,356 | A | 5/1994 | Shigeru | | |
| 5,347,084 | A * | 9/1994 | Roney | | G02B 6/4447 174/92 |
| 5,397,859 | A * | 3/1995 | Robertson | | H01R 4/70 174/84 R |
| 5,594,210 | A * | 1/1997 | Yabe | | H01R 4/70 174/76 |
| 5,606,150 | A * | 2/1997 | Radliff | | H01R 4/646 174/92 |
| 5,674,089 | A * | 10/1997 | Sampson | | H02G 15/113 439/521 |
| 5,763,835 | A * | 6/1998 | Huynh-Ba | | G02B 6/4446 174/138 F |
| 5,796,041 | A * | 8/1998 | Suzuki | | H02G 15/18 174/92 |
| 5,945,634 | A | 8/1999 | Shimirak | | |
| 5,961,341 | A | 10/1999 | Knowles | | |
| 6,099,340 | A * | 8/2000 | Florentine | | H01R 13/6392 439/367 |
| 6,111,201 | A * | 8/2000 | Drane | | H02G 15/18 174/92 |
| 6,169,250 | B1 * | 1/2001 | Bolcato | | H02G 15/10 174/92 |
| 6,265,665 | B1 * | 7/2001 | Zahnen | | H01R 4/70 174/70 A |
| 6,280,235 | B1 * | 8/2001 | Radliff | | H01R 13/501 439/456 |
| 6,568,952 | B1 | 5/2003 | Tomasino | | |
| 6,881,901 | B2 * | 4/2005 | Egan | | H02G 15/013 16/2.1 |
| 7,109,416 | B1 * | 9/2006 | Reed | | H02G 15/113 174/481 |
| 7,138,580 | B2 * | 11/2006 | Boutin | | H01R 13/447 174/84 R |
| 7,141,738 | B2 * | 11/2006 | Marsac | | G02B 6/4446 174/92 |
| 7,214,735 | B2 * | 5/2007 | Jego Stora | | C09K 3/1018 524/588 |
| 7,273,984 | B2 * | 9/2007 | Murphy | | H01R 13/5213 174/92 |
| 7,285,725 | B1 * | 10/2007 | Saman | | H01R 13/5221 174/84 R |
| 7,432,445 | B2 * | 10/2008 | Bird | | H02G 15/113 174/92 |
| 7,677,932 | B2 * | 3/2010 | King, Jr. | | H01R 4/36 439/521 |
| 7,798,837 | B1 * | 9/2010 | Gardner | | G01G 23/017 174/66 |
| 7,799,995 | B2 * | 9/2010 | Mullaney | | G02B 6/4447 174/77 R |
| 7,845,990 | B2 * | 12/2010 | Shrum | | H01R 13/5216 174/66 |
| 7,950,956 | B2 * | 5/2011 | Hiner | | H01R 4/70 174/138 F |
| 7,988,503 | B2 * | 8/2011 | King, Jr. | | H01R 4/36 439/521 |
| 8,063,306 | B2 * | 11/2011 | Zhong | | H02G 15/113 174/92 |
| 8,084,691 | B2 * | 12/2011 | Pullium, III | | H01R 4/70 174/92 |
| 8,178,783 | B2 * | 5/2012 | Yaworski | | H02G 15/113 174/92 |
| 8,227,696 | B2 * | 7/2012 | Pullium, III | | H01R 4/70 174/92 |
| 8,476,540 | B2 * | 7/2013 | Dahl | | H02G 3/088 174/50 |
| 8,637,774 | B2 * | 1/2014 | Hiner | | H01R 4/70 174/138 F |
| 8,839,594 | B2 * | 9/2014 | Smith | | H02G 3/083 174/50 |
| 8,960,973 | B1 * | 2/2015 | Kathawate | | H01R 4/70 174/92 |
| 9,012,774 | B2 * | 4/2015 | Simmons | | H01R 9/223 174/50.5 |
| 9,653,837 | B2 * | 5/2017 | Nooner | | H01R 13/5208 |
| 2004/0238201 | A1 * | 12/2004 | Asakura | | H02G 15/013 174/92 |
| 2006/0240706 | A1 * | 10/2006 | Boutin | | H01R 13/447 439/521 |
| 2008/0142243 | A1 | 6/2008 | Bird | | |
| 2010/0029147 | A1 * | 2/2010 | Shrum | | H01R 4/5091 439/863 |
| 2012/0279749 | A1 * | 11/2012 | Badura | | H02G 15/013 174/92 |

OTHER PUBLICATIONS

Jandorf 60795 Self-Stripping Insulated T-tap. Downloaded Jun. 6, 2017.

* cited by examiner

CONNECTION SHIELD FOR POWER DISTRIBUTION NETWORKS

CROSS-REFERENCE TO RELATED APPLICATIONS

This application claims benefit of U.S. provisional patent application Ser. No. 62/538,578, filed on Jul. 28, 2017, the entirety of which is incorporated herein by this reference thereto.

BACKGROUND

Technical Field

The present disclosure relates to apparatus for construction and maintenance of power distribution networks. More particularly, the present disclosure relates to a connection shield for power distribution networks.

Background Discussion

A secondary network is an AC (alternating current) power distribution system in which electricity is delivered through a complex and integrated system of multiple transformers and underground cables that are connected and operate in parallel. Power can flow in either direction on the lower-voltage service delivery lines, commonly called "secondary distribution lines." The loss of a single line or transformer in a secondary network does not cause an interruption of power.

Typically, customers are served from three-phase, four-wire low-voltage circuits supplied by two or more network transformers whose low-voltage terminals are connected to the low-voltage circuits through network protectors. Generally, a secondary network system has two or more high-voltage primary feeders, with each primary feeder typically supplying 1-30 network transformers, depending on network size and design. The system includes automatic protective devices intended to isolate faulted primary feeders, network transformers, or low-voltage cable sections while maintaining service to the customers served from the low-voltage circuits. Individual cables are spliced to each other using wiring tap-in connectors, generally known as "taps" or "t-taps." In particular, the type of tap typically used in secondary networks is known to those of ordinary skill as a "compression tap." These connectors are designed to splice connections into other wires without the need for cutting and soldering.

Secondary network areas provide heightened levels of reliability in densely populated areas and are designed to meet the higher reliability needs and limited space commonly encountered in urban areas. Because they are generally located outside or underground, it is essential to shield spliced connections from environmental disruption, such as water damage. Conventionally, this is accomplished by wrapping the connection thoroughly with a moisture-resistant dielectric tape and then thoroughly sealing the taped connection using a heavy application of a moisture-resistant resin. Unfortunately, application of the tape and the resin is quite time-consuming.

Furthermore, if the connection fails, it must be exposed in order to repair it. Removing the tape and resin protecting the connection is very resource-intensive, primarily in terms of the man-hours required to manually remove the resin and the tape.

SUMMARY

A shield for spliced electrical connections includes a cover for T-tap electrical connections. In embodiments, the cover includes complementary halves designed to quickly and securely snap together when the halves are mated with each other to create a shield for a T-tap connection. Fully assembled, the shield provides sleeves that allow the cables being spliced to enter and/or exit the shield. Each of the sleeves is provided with an adhesive sealant that tightly seals the shield against contamination from the elements. Integrated with the cover are structural elements such as gussets that enhance the resistance of the shield to impact damage such as crushing. The shield may be molded from a polymer that, when cured, provides a rigid or semi-rigid cover that generally protects the t-tap connection from all types of environmental damage.

DETAILED DESCRIPTION

A shield for spliced electrical connections includes a cover for T-tap electrical connections. In embodiments, the cover includes complementary halves designed to quickly and securely snap together when the halves are mated with each other to create a shield for a T-tap connection. Fully assembled, the shield provides sleeves that allow the cables being spliced to enter and/or exit the shield. Each of the sleeves is provided with an adhesive sealant that tightly seals the shield against contamination from the elements. Integrated with the cover are structural elements such as gussets that enhance the resistance of the shield to impact damage such as crushing. The shield may be molded from a polymer that, when cured, provides a rigid or semi-rigid cover that generally protects the t-tap connection from all types of environmental damage.

Figure 1:
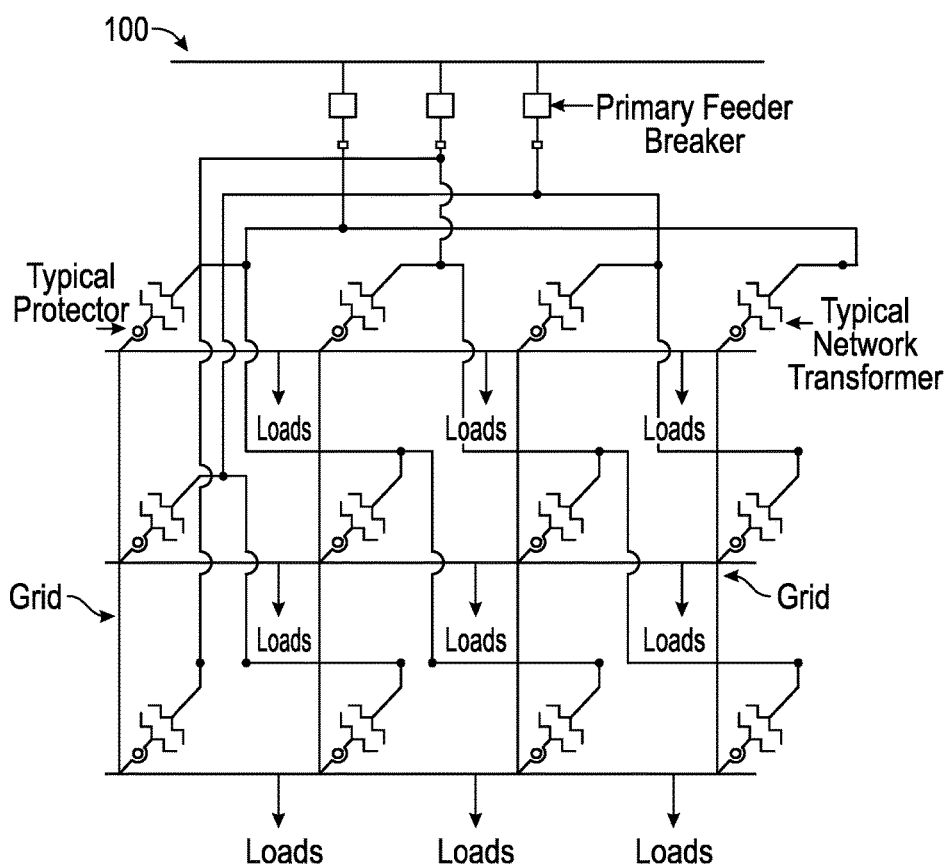
FIG. 1 provides a topology diagram of an exemplary secondary network.

Referring now to FIG. 1, shown is a topology diagram 100 of a conventional secondary network. As shown, a secondary network includes a complex and integrated system of multiple transformers and underground cables that are connected and operate in parallel and including many secondary lines. One of ordinary skill will readily appreciate that a typical secondary network involves many spliced connections. In view of the fact that secondary networks are typically outside or underground, there exists a multitude of ways in which the connections can be damaged and/or disrupted. Thus, it is imperative to find a simple, cost effective way to shield the connections from environmental damage.

At the present time, there exist no practical solutions for protecting these vital electrical connections. Current practice is to wrap the connection thoroughly with dielectric tape and then to cover the taped connection with a sealant. This method is messy, time-consuming and error-prone. If a connection fails or is otherwise in need of repair, the layer of sealant and the dielectric tape must be removed in order to access the t-tap. There appears to be no efficient way to remove the tape and the sealant. It must be manually removed by utility workers, slowly and laboriously, at great cost to the utility and its customers. Additionally, it is a boring, laborious task that is never greeted with enthusiasm by linemen and other utility employees. There thus exists a great need to provide a means of shielding these electrical connections that is quickly and easily applied and removed and which reduces the failure rate endemic to the conventional method.

Figure 2:
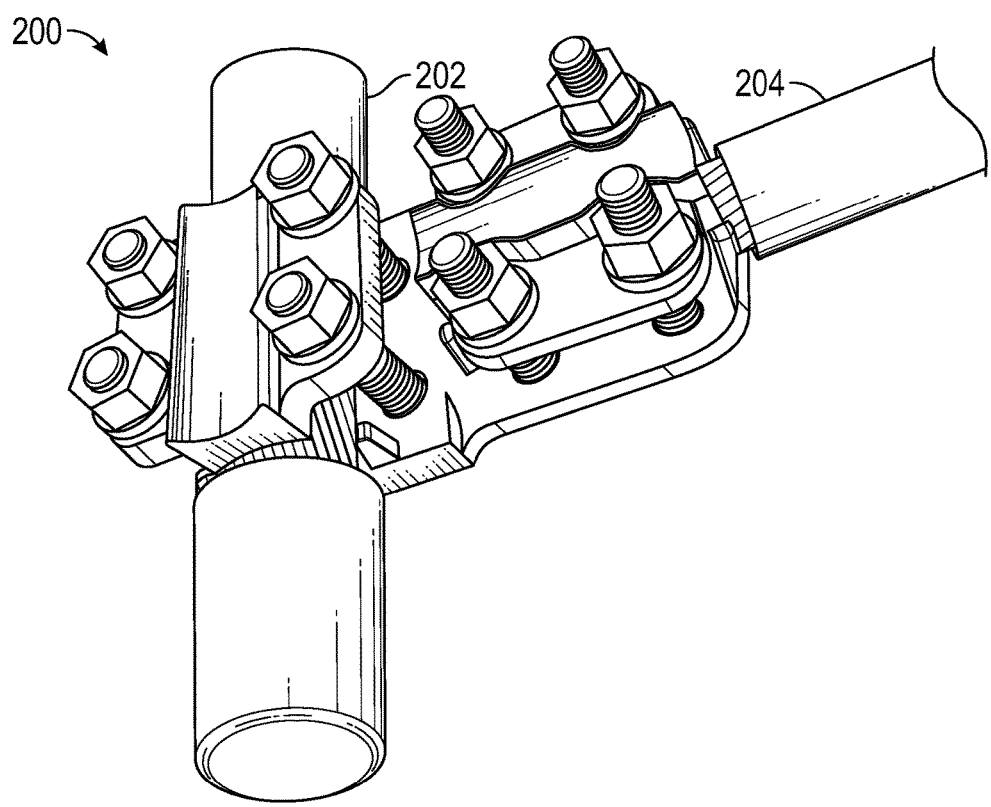
FIG. 2 provides an illustration of a compression tap that may be found in a secondary network.

FIG. 2 provides an illustration of the type of T-tap 200 commonly used in secondary networks, ordinarily known as a "compression tap," for forming a "T-splice," in which the end of a first wire 204 is spliced to the middle of a second wire 202, resulting in a T-shape. Typically, the second wire 202 is called the main cable and the first wire 204 is called the branch cable or the tap cable. T-splices are exceedingly common in power distribution networks such as secondary networks. While there are other methods of creating T-splices, a compression tap allows utility employees to quickly and securely splice two wires together. FIG. 2 clearly shows a tap wire spliced to a main wire to form a T-splice.

Figure 3:
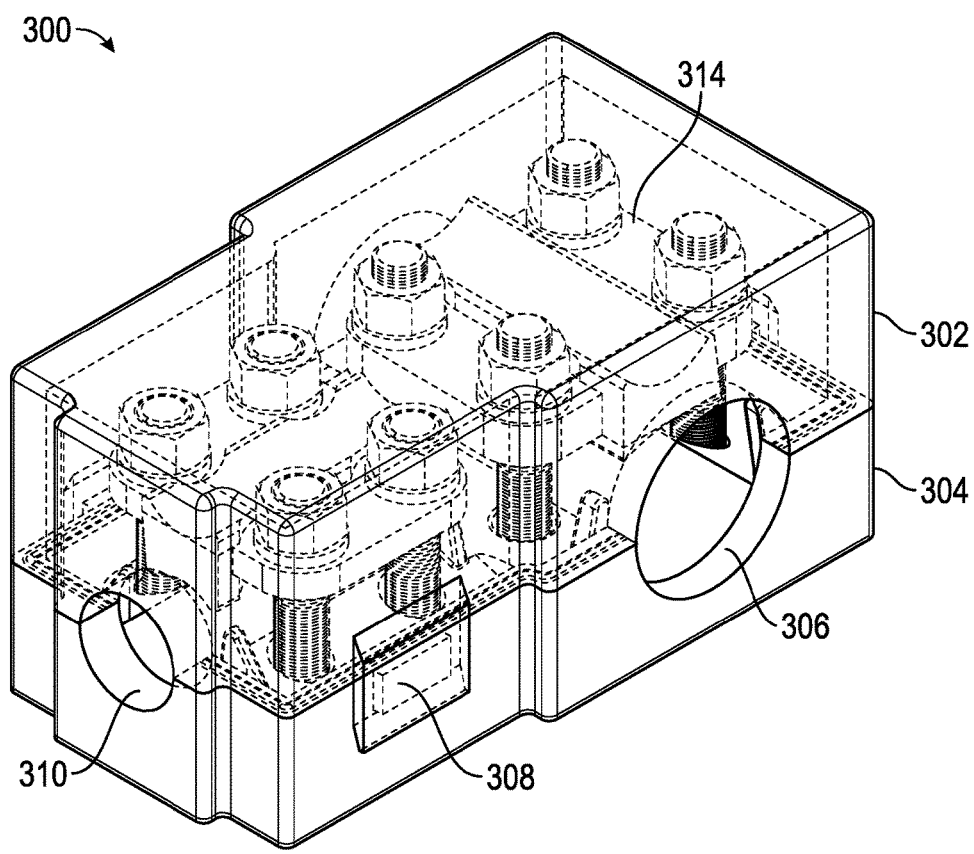
FIG. 3 provides an isometric view of an assembly that includes a shield for spliced electrical connections having a compression tap enclosed therein.

FIG. 3 provides a plan view of a shield assembly 300 for spliced electrical connections. Because the shield 300 assembly includes two substantially identical halves 302, 304, it is to be appreciated that one half of the shield is a mirror image of the other half, possibly with minor differences in details. A plurality of gussets or ribs may be integrated with the body of the shield 300 to provide enhanced structural resistance to insults such as crushing. In either side of the shield, for example, toward the proximal end, sleeves 306 are provided that receive, for example, a main cable 202. Thus, if one were applying the half 304 of the shield to a t-tap connection, the cable 202 would lie within the two sleeves 306 as it traverses the width of the shield 300. At the distal end of the shield 300, a third sleeve 310 is provided that receives the tap wire 204 being spliced to the main wire 202. A plurality of fasteners 308, 312 is provided around the sides of each of the two halves 302, 304 that snap together, tightly and securely, as the two halves 304,302 are mated with each other.

Also shown in FIG. 300, in hidden lines, is a compression T-tap 314, which demonstrates enclosure of the T-Tap 314 within the mated halves 302, 304 to form a shield assembly 300.

In embodiments, a dielectric sealant on the inner surfaces of the sleeves tightly surrounds the cables and further shields the t-tap 314 from, for example, moisture damage.

Thus, during deployment, the shield is quickly snapped into place, enclosing the t-tap connection to form an assembly 300 that is impervious to environmental contamination and damage. Furthermore, the shield is just as easily removed as it is applied.

Figure 4:
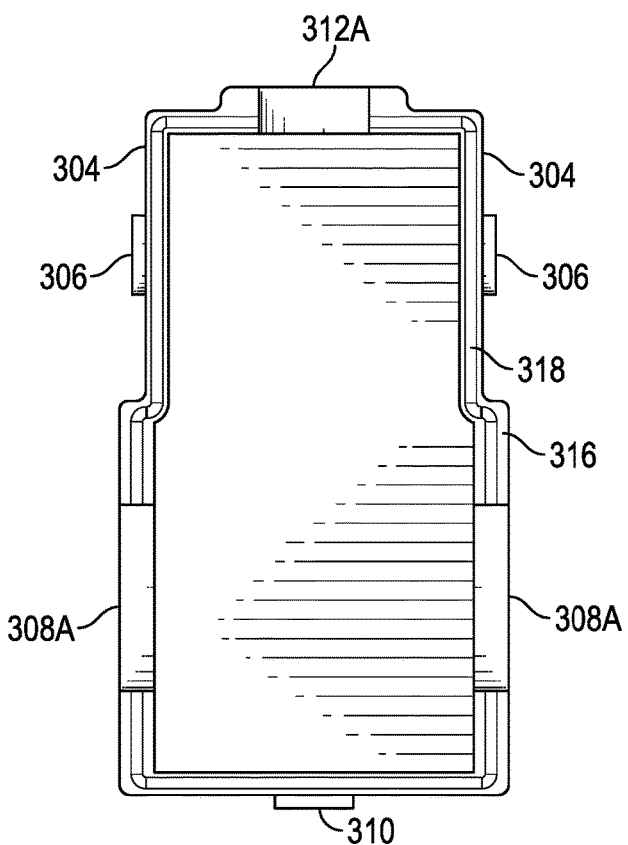
FIG. 4 provides a plan view of a first surface of a first half of the shield of FIG. 3.

FIG. 4 provides a plan view of a mating surface of a first half 304 of the shield of FIG. 3. As shown, the mating surface is formed at the terminal edge 320 of the first half 304. In embodiments, the terminal edge 320 widens into a lip 316. The two edges of the lip 316 define a channel 318 which receives a complementary flange 322 protruding from a mating surface of the second half 302. The sleeves 306 for receiving the main cable 202 are shown. Also shown is an additional sleeve 310 at the distal end for receiving the tap cable 204. Fasteners 308A, 312B are provided for securely fastening the two halves 302, 304 to each other. More will be said about the fasteners herein below.

Figure 5:
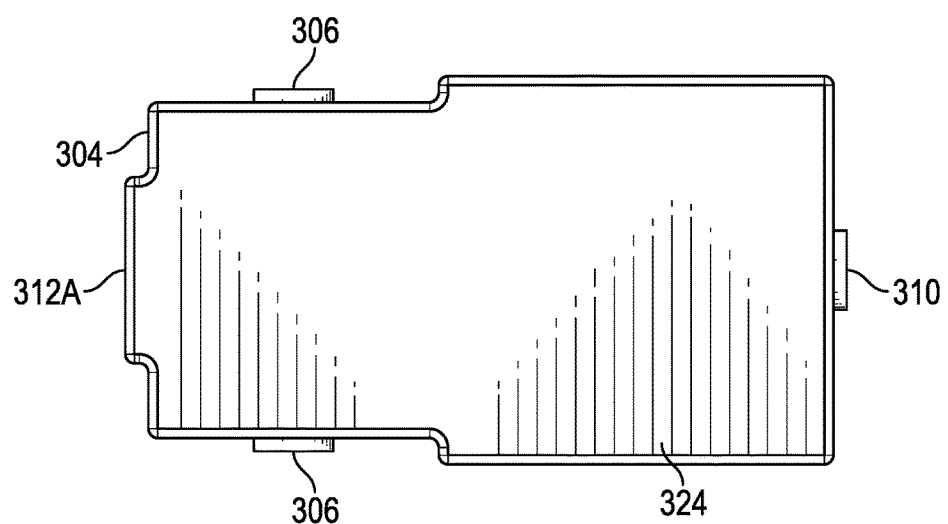
FIG. 5 provides a plan view of a second surface of a first half of the shield of FIG. 3.

FIG. 5 shows a plan view of an opposing side of the first half 304. With the exception of the sleeves 306, 310 and the fastener 312A, in embodiments, the opposing side provides little else in the way of functional features. In embodiments, the two halves 302, 304 may have integral structural ribs 324 to enable the shield assembly to withstand pressure and impact and other insults.

Figure 6:
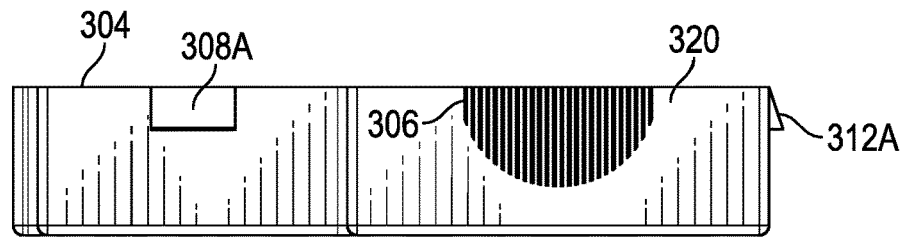
FIG. 6 provides a side elevation of the first half of the shield of FIG. 3.

FIG. 6 shows a side elevation of the first half 304. Notably, one sees that the each of the sleeves 306 includes two complementary halves, one half sleeve integrated with each of the halves to form a whole sleeve when the halves are mated with each other.

Figure 7:
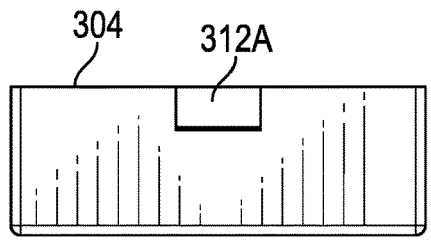
FIG. 7 provides an elevation of a proximal end of the first half of the shield of FIG. 3

FIG. 7 provides an elevation of the proximal end of the first half, with a fastener 312 being visible.

Figure 9:
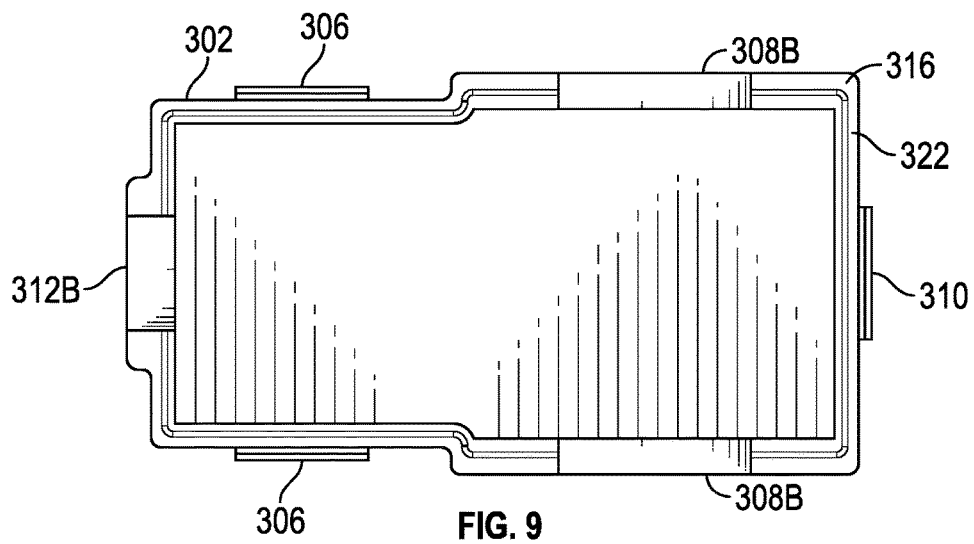
FIG. 9 provides a plan view of a second surface of a second half of the shield of FIG. 3.

FIG. 9 provides a plan view of a mating surface of a second half 302 of the shield of FIG. 3. As shown, the mating surface is formed at the terminal edge 320 of the second half 302. In embodiments, the terminal edge 320 widens into a lip 316. Continuous with the lip 316 is a flange 322 which protrudes from the lip 316 a sufficient amount to be received by the complementary groove 318 in the lip 316 of the first half 304. The sleeves 306 for receiving the main cable 202 are shown. Also shown is an additional sleeve 310 at the distal end for receiving the tap cable 204. Fasteners 308B, 312B are provided for securely fastening the two halves 302, 304 to each other.

Figure 8:
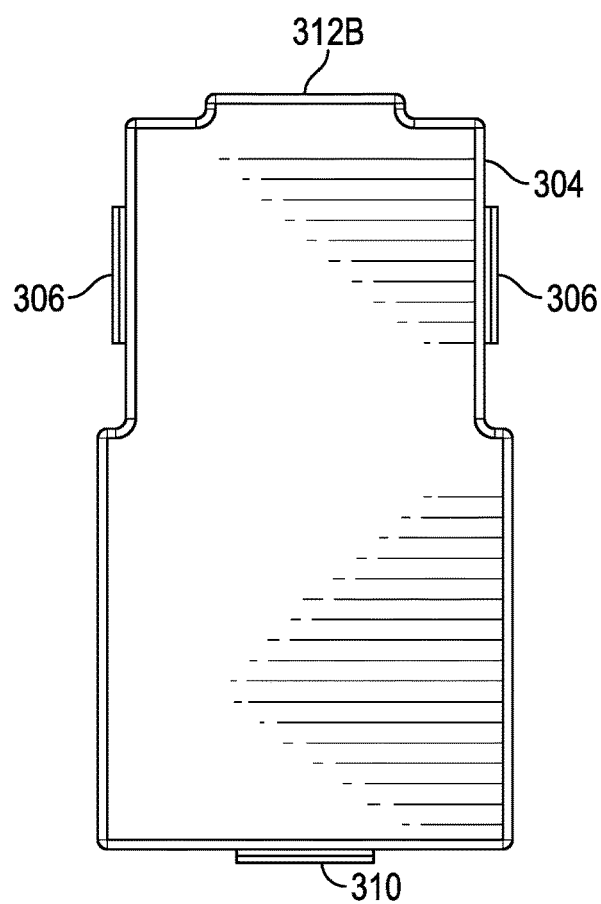
FIG. 8 provides a plan view of a first surface of a second half of the shield of FIG. 3.

FIG. 8 shows a plan view of an opposing side of the second half 302. With the exception of the sleeves 306, 310 and the fastener 312B, in embodiments, the opposing side provides little else in the way of functional features. In embodiments, the two halves 302, 304 may have integral structural ribs 324 to enable the shield assembly to withstand pressure and impact and other insults.

Figure 10:
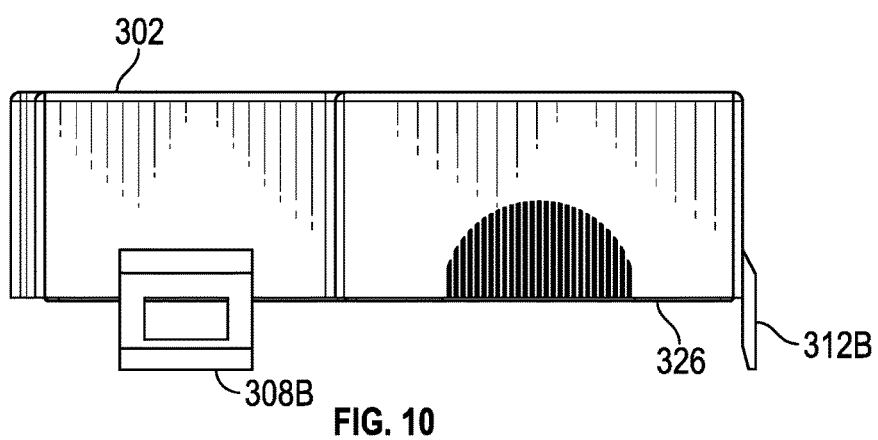
FIG. 10 provides a side elevation of the second half of the shield of FIG. 3.

FIG. 10 shows a side elevation of the second half 302. Notably, one sees that each of the sleeves 306 includes two complementary halves, one half sleeve integrated with each of the halves to form a whole sleeve when the halves are mated with each other.

Figure 11:
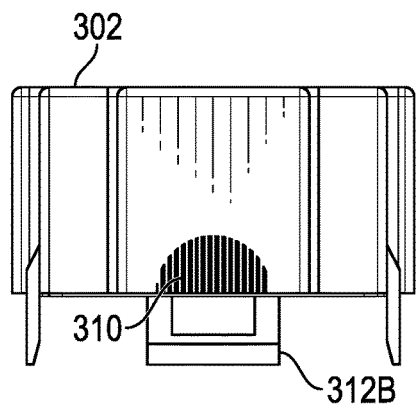
FIG. 11 provides an elevation of a distal end of the second half of the shield of FIG. 3.

FIG. 11 provides an elevation of the distal end of the first half 302, with a fastener 312B being visible.

In embodiments, the inner surfaces of the sleeves 306, 310 may be coated with a dielectric sealant. Examples of such a dielectric sealant may include silicone sealant or silicone grease. In embodiments, the shield may be provided by the supplier with the inner surface of the sleeves being pre-coated in order to maximize efficiency of use. In embodiments, the sealant may be introduced at the time of deployment by the installer.

It is to be appreciated that embodiments may include an alternate set of features for allowing the halves 302, 304 to mate with each other. For example, each of the halves may be provided with a mating surface having a protruding flange, with the flanges being offset from each other just enough so that the halves fit securely together.

As previously described, the halves 302, 304 are provided with fasteners 308, 312 for securely fastening the halves to each other. In embodiments, each fastener includes a complementary part, A and B respectively, in which the complementary parts interlock securely with each other.

In embodiments, the fasteners 308, 312 include interlocking male and female elements. In embodiments the male element may be a vertically-biased barbed tab or clip which is continuous with the wall of one of the halves. The female element may be a slot in a horizontal tab which is continuous with the lip of the opposing half. As the male element is inserted into the female element, the forward movement of the barb against a side of the slot forces the tab away from its biased position. When the barb clears the slot, the vertical tab returns to its biased position, causing the elements to snap together. One may undo the fastener by applying pressure to the barbed tab, allowing the two elements to disengage from each other. In embodiments, the fasteners may include hardware that is fixedly attached to the exteriors of the two halves and which snap or clip together securely when they are engaged. Attached fasteners shall be fabricated from a dielectric material.

In embodiments, the shield is produced from a polymer using an injection molding process. A primary characteristic of the material is that it be dielectric. That is, that it be a poor conductor of electricity. The polymer used to produce the shield may be selected for its insulative properties. Exemplary materials include:
- acetate;
- high impact polystyrene (HIPS);
- MELDIN 7001 (Unfilled polyimide);
- nylon reinforced phenolic;
- polycarbonate;
- polypropylene;
- polyurethane; and
- Polyvinyl chloride.

Embodiments may be insulated for up to 600V, AC or DC.

Embodiments may be designed to have a service life of at least 5 years.

Embodiments may be serviceable for thirty years or more in and underground environment and fifteen years or more in outdoor applications.

Embodiments fit wire in sizes from 250 KCMIL (circular mils) to 2000 KCMIL.

Embodiments of the shield are provided in a range of sizes to accommodate the array of differently-sized t-taps available in the marketplace.

While the shield has been described herein above with respect to t-tap connections in secondary networks, embodiments of the shield are applicable to any type of electrical connection involving in-line taps, in any type of electrical environment. More particularly, the shield is applicable to spliced connections in any type of electrical environment. For example, embodiments may be deployed in spot networks and radial networks. Additionally, embodiments may be deployed in any environment or setting in which spliced connections involving in-line taps need to be shielded for any reason.

Embodiments may include a product wherein a shield and a T-tap connector are provided together, for example in a single package.

While the foregoing written description of the embodiments enables one of ordinary skill to make and use a device as described, those of ordinary skill will understand and appreciate the existence of variations, combinations, and equivalents of the specific embodiments, methods, and examples herein. The specification described here should therefore not be limited by the above described embodiments, methods, and examples, but by all embodiments and methods within the scope and spirit of the attached claims.

The invention claimed is:

1. A shield for spliced electrical connections comprising;
   a cover, the cover including two complementary halves, each half a separate piece from the remaining half, that reversibly fasten together to form a single unit that, when deployed, surrounds a spliced electrical connection;
   a first of the two complementary halves including a terminal edge that widens into a lip, edges of the lip defining a central channel in the lip;
   a second of the two complementary halves including a terminal edge that widens into a lip and a flange protruding from the lip, wherein the flange is received by the central channel so that the two halves interlock when they are mated with each other;
   the cover including a plurality of sleeves for receiving cables to be spliced; and
   a sealant to prevent intrusion of damaging elements into the shield.

2. A shield as in claim 1, further comprising integrated structural elements for reinforcing said cover.

3. A shield as in claim 1, further comprising at least one integrated closure for reversibly fastening the two complementary halves together.

4. A shield as in claim 3, said closure comprising integral male and female elements that snap together when engaged so that a tight secure connection between the halves is formed.

5. A shield as in claim 3, said closure comprising sets of complementary hardware elements fixedly attached to walls of the two halves which reversibly latch together when engaged.

6. A shield as in claim 1, wherein said cover is fabricated from a dielectric polymer.

7. As shield as in claim 1, wherein said sealant comprises either of:
   silicone grease; and
   silicone sealant.

8. A shield as in claim 1, wherein said spliced electrical connection comprises a t-tap connection.

9. A shield as in claim 1, wherein said shield is universal in size for t-tap connections.

10. A shield as in claim 1, wherein said shield is provided in sizes for different t-tap connections.

11. An assembly comprising:
    a compression t-tap; and
    a shield for spliced electrical connections enclosing said compression T-tap, the shield comprising
    a cover, the cover including two complementary halves, each half a separate piece from the remaining half, that reversibly fasten together to form a single unit that, when deployed, surrounds a spliced electrical connection;
    a first of the two complementary halves including a terminal edge that widens into a lip, the edges of the lip defining a central channel in the lip;
    a second of the two complementary halves including a terminal edge that widens into a lip and a flange protruding from the lip, wherein the flange is received by the central channel when the two halves are mated with each other.

12. The assembly of claim 11, wherein the cover includes
a plurality of sleeves for receiving cables to be spliced; and
   a sealant to prevent intrusion of damaging elements into the shield.

13. An assembly as in claim 12, said shield further comprising integrated structural elements for reinforcing said cover.

14. An assembly as in claim 12, said shield further comprising at least one integrated closure for reversibly fastening the two complementary halves together.

15. An assembly as in claim 14, said closure comprising either of:
   integral male and female elements that snap together when engaged so that a tight secure connection between the halves is formed; and
   a plurality of sets of complementary hardware elements fixedly attached to walls of the two halves which reversibly snap together when engaged.

16. An assembly as in claim 12, wherein said cover is fabricated from a dielectric polymer.

17. An assembly as in claim 12, wherein said sealant comprises either of:
   silicone grease; and
   silicone sealant.

18. An assembly as in claim 12, wherein said shield is universal in size for t-tap connections.

19. An assembly as in claim 12, wherein said shield is provided in sizes for different t-tap connections.

* * * * *